(12) United States Patent
Song (10) Patent No.: US 12,499,929 B2
(45) Date of Patent: Dec. 16, 2025

(54) MEMORY CONTROLLER, MEMORY SYSTEM INCLUDING THE SAME, AND OPERATING METHOD THEREOF

(71) Applicant: SK hynix Inc., Gyeonggi-do (KR)

(72) Inventor: Choung Ki Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 225 days.

(21) Appl. No.: 18/499,219

(22) Filed: Nov. 1, 2023

(65) Prior Publication Data

US 2024/0428845 A1    Dec. 26, 2024

(30) Foreign Application Priority Data

Jun. 23, 2023  (KR) .................. 10-2023-0081037

(51) Int. Cl.
  *G11C 11/00*   (2006.01)
  *G11C 11/4072*  (2006.01)
  *G11C 11/4078*  (2006.01)
  *G11C 11/408*  (2006.01)

(52) U.S. Cl.
  CPC ...... *G11C 11/4078* (2013.01); *G11C 11/4072* (2013.01); *G11C 11/408* (2013.01)

(58) Field of Classification Search
  CPC ......... G11C 11/40611; G11C 11/40618; G11C 11/406; G11C 11/4096; G11C 11/408; G11C 11/40622; G11C 11/4076; G11C 11/4087; G11C 11/4078; G11C 11/4085; G11C 11/40603; G11C 2211/4065; G11C 11/40615; G11C 11/40626; G11C 11/4091; G11C 15/00; G11C 16/3431; G11C 16/349; G11C 2211/406; G11C 2211/4061; G11C 29/023; G11C 29/028; G11C 29/50016; G11C 29/70; G11C 7/00; G11C 7/1039; G11C 7/24; G11C 11/4063; G11C 16/3418; G11C 7/1075; G11C 7/222; G11C 8/06

See application file for complete search history.

(56) References Cited

U.S. PATENT DOCUMENTS 9,761,298 B2   9/2017  Halbert et al.
10,497,409 B2  12/2019  Kilmer et al.
11,688,452 B2 *  6/2023  Nale .............. G11C 11/4096
                                          365/149
2020/0356312 A1  11/2020  Liu et al.

* cited by examiner

*Primary Examiner* — Thong Q Le
(74) *Attorney, Agent, or Firm* — IP & T GROUP LLP (57) ABSTRACT

A memory controller includes a scheduler configured to generate an active command and an active address, and determine whether to issue the active command and the active address according to an output control signal; a row-hammer detector configured to generate the output control signal by checking a row-hammer possibility based on the active command and the active address; and a memory interface configured to provide the active command and the active address issued by the scheduler to a memory device.

13 Claims, 9 Drawing Sheets

| DEPTH of ARRESS QUEUE | MAXIMUM RH COUNT |
|---|---|
| 1 | 600K |
| 2 | 300K |
| 4 | 150K |
| 8 | 75K |
| 16 | 37.5K |
| 32 | 18.75K |
| 64 | 9.375K |

MEMORY CONTROLLER, MEMORY SYSTEM INCLUDING THE SAME, AND OPERATING METHOD THEREOF

CROSS-REFERENCE TO RELATED APPLICATION

The present application claims the benefit of Korean Patent Application No. 10-2023-0081037, filed on Jun. 23, 2023, which is incorporated herein by reference in its entirety.

BACKGROUND

1. Field

Various embodiments of the present invention relate to a semiconductor design technology, and more particularly, to a memory system including a memory controller and a memory device.

2. Description of the Related Art

As the degree of integration of a memory device increases, an interval between a plurality of word lines included in the memory device is decreasing. As the interval between the plurality of word lines decreases, the coupling effect between adjacent word lines increases.

Whenever data is input or output to a memory cell, a word line toggles between an active state and an inactive state. Due to the increased coupling effect between adjacent word lines, data stored in memory cells coupled to neighboring word lines disposed adjacent to a target word line with a large number of activations or a high frequency of activations may be damaged. Such a phenomenon is referred to as Row-Hammer attacks, and various methods have been studied to mitigate the impact of the Row-Hammer attacks. To select a target word line to be refreshed during a target refresh operation, the memory device needs to count all row addresses inputted with an active command. The memory device has counting circuits to count the number of inputs of the row addresses, and as technological scaling progresses, the narrower the linewidth of the memory device, the larger the portion the counting circuits occupy.

SUMMARY

Embodiments of the present invention are directed to a memory system including a memory controller capable of issuing an active command to a memory device by checking the active command repeatedly/frequently input to a specific word line.

According to an embodiment of the present invention, a memory controller includes a scheduler configured to generate an active command and an active address, and determine whether to issue the active command and the active address according to an output control signal; a row-hammer detector configured to generate the output control signal by checking a row-hammer possibility based on the active command and the active address; and a memory interface configured to provide the active command and the active address issued by the scheduler to a memory device.

According to an embodiment of the present invention, a memory system includes a memory device including a plurality of rows respectively coupled to memory cells; and a memory controller configured to generate an access command and an access address for each row, check a row-hammer possibility based on the access command and the access address to generate an output control signal, and determine whether to issue the access command and the access address to the memory device, according to the output control signal.

According to an embodiment of the present invention, an operating method of a memory controller includes generating an active command and an active address; comparing the active address with a plurality of candidate addresses stored in an address queue; and issuing, according to a determination that the active address is different from all of the plurality of candidate addresses, the active command and the active address to a memory device while storing the active address as one of the plurality of candidate addresses in the address queue.

Further, according to embodiments of the present invention, the memory system may achieve the row-hammer mitigation in a way that the memory controller may detect an active command repeatedly input for a specific word line for each unit section and delay the issuance of the detected active command until the next unit section.

DETAILED DESCRIPTION

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present invention.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

Figure 1A:
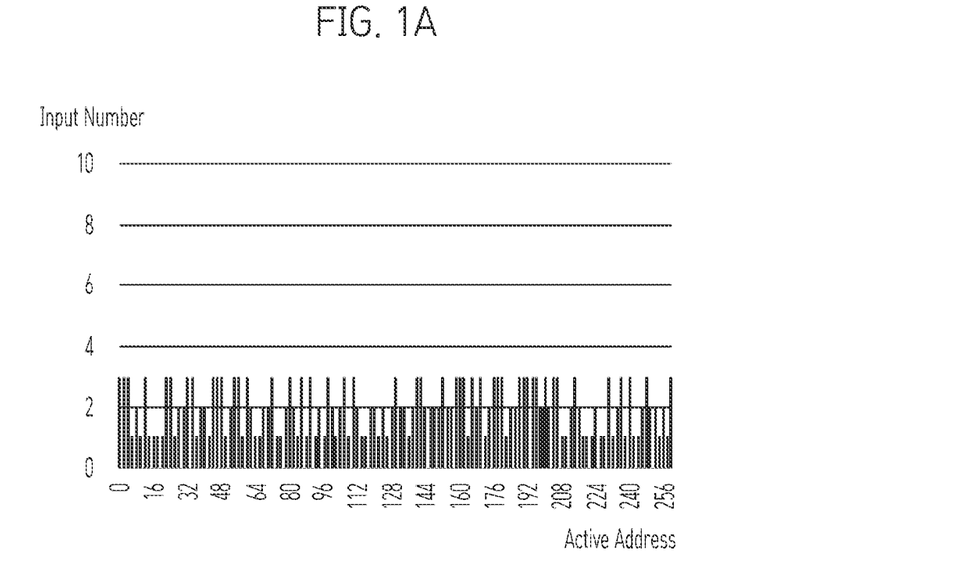
FIGS. 1A and 1B are graphs illustrating the number of inputs for an active address.
Figure 1B:
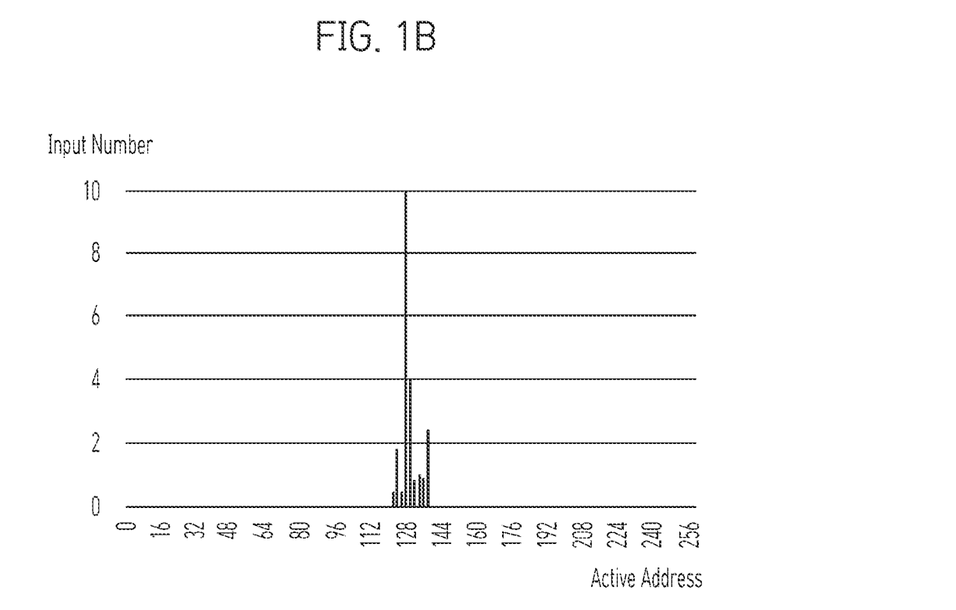

FIGS. 1A and 1B are graphs illustrating the number of inputs for an active address.

Referring to FIG. 1A, it is illustrated that addresses (hereinafter referred to as "active addresses") that are entered with an active command during one refresh cycle are evenly distributed. That is, FIG. 1A shows a case where a risk of the row-hammer attacks is lower since the number of activations per address is evenly distributed. In this case, since the number of activations per address within one refresh cycle (hereinafter referred to as "active aggressor") is small, a memory device may respond to the risk of the row-hammer attacks through a target refresh operation performed autonomously.

Referring to FIG. 1B, it is illustrated that the active addresses during one refresh cycle are concentrated only on some particular addresses. That is, FIG. 1B shows a case where the active aggressor per address is abnormally increased due to a special occurrence such as hacking, resulting in the high risk of the row-hammer attacks. In this case, since the target refresh operation performed within the memory device alone makes it difficult to respond to the row-hammer attacks, additional help from a memory controller is needed.

Disclosed hereinafter is a scheme of achieving the row-hammer mitigation of the memory system. In accordance with an embodiment of the present invention, the memory controller may detect a case where the number of active attacks is concentrated at a specific active address, and schedule an issuance of an active command for the specific active address to be delayed.

Figure 2:
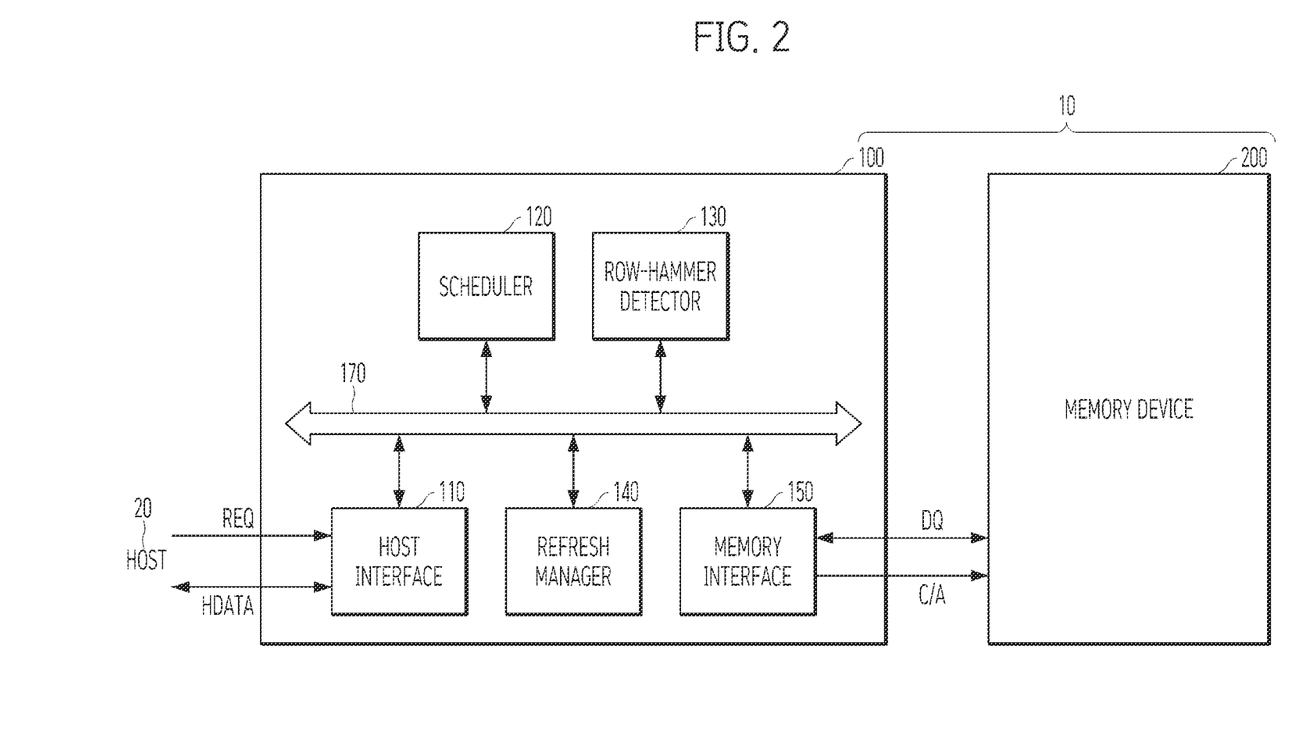
FIG. 2 is a block diagram illustrating a memory system in accordance with an embodiment of the present invention.

FIG. 2 is a block diagram illustrating a memory system 10 in accordance with an embodiment of the present invention.

Referring to FIG. 2, the memory system 10 may include a memory controller 100 and a semiconductor memory device 200.

The memory controller 100 may control the general operations of the memory system 10 and control data communication between a host 20 and the semiconductor memory device 200. The memory controller 100 may generate a command/address signal C/A according to a request REQ from the host 20 and provide the generated command/address signal C/A to the semiconductor memory device 200. The memory controller 100 may provide data DQ corresponding to host data HDATA provided from the host 20 to the semiconductor memory device 200. The memory controller 100 may receive data DQ read from the semiconductor memory device 200 and provide the data DQ to the host 20 as the host data HDATA.

The host 20 may include a central processing unit (CPU), a graphic processing unit (GPU), an application processor (AP), and the like. The memory controller 100 may be included in a CPU, a GPU, an AP, or the like, and in this case, the host 20 may mean a configuration other than the memory controller 100 in these configurations. For example, when the memory controller 100 is included in the CPU, the host 20 may represent the remaining components in the CPU except the memory controller 100.

In detail, the memory controller 100 may include a host interface 110, a scheduler 120, a row-hammer detector 130, a refresh manager 140, a memory interface 150, and a bus 170.

The host interface 110 may be configured to communicate with the host 20 connected to the memory system 10. For example, the host interface 110 may receive the request REQ and the host data HDATA from the host 20. The host interface 110 may provide the host data HDATA to the semiconductor memory device 200 through the memory interface 150 and provide the host data HDATA to the host 20 by receiving the data DQ read from the semiconductor memory device 200 through the memory interface 150.

The scheduler 120 may receive the request REQ from the host 20 through the host interface 110. The scheduler 120 may generate an address and various commands such as an active command, a precharge command, a read command, a write command, and the like, according to the request REQ. The scheduler 120 may determine the order of requests to be directed to the semiconductor memory device 200 among the requests REQ from the host 20, and generate the command and address to be provided to the semiconductor memory device 200 according to the order of a predetermined operation. The scheduler 120 may change the order in which the request REQ is received from the host 20 and the order of the operation to be instructed to the semiconductor memory device 200 to improve the performance of the semiconductor memory device 200. For example, the scheduler 120 may adjust the order so that a write operation is performed before a read operation, even if the host 20 requests the read operation of the semiconductor memory device 200 first and the write operation later.

In an embodiment, the scheduler 120 may determine whether to issue an active command and an active address provided together with the active command, according to an output control signal. When the output control signal is activated, the scheduler 120 may issue an active command and an active address to the memory interface 150. When the output control signal is deactivated, the scheduler 120 may interrupt (i.e., block or disable) the issuance of an active command and an active address. The scheduler 120 may transmit the active command and the active address to the memory interface 150 after delaying the issuance of the active command and the active address for a predetermined time.

The row-hammer detector 130 may generate the output control signal by checking a possibility (i.e., probability or likelihood) of row-hammer attacks (hereinafter, referred to as a row-hammer possibility) based on the active command and the active address. The row-hammer detector 130 may store the active address as a candidate address for each preset unit section (i.e., unit time period), deactivate the output control signal when the currently inputted active address matches one of the candidate addresses, and activate the output control signal when the currently inputted active address is different from all candidate addresses.

The refresh manager 140 may generate a command relating to a refresh operation and provide the refresh-related command to the memory interface 150. The refresh-related command may include a normal refresh command and a refresh management command. The refresh manager 140 may generate a preset number of normal refresh commands at regular intervals during a refresh time defined in the specification. The refresh manager 140 may generate a refresh management command based on the active command provided from scheduler 120. For example, the refresh manager 140 may generate the refresh management command whenever the number of inputs of the active command reaches a certain number.

In an embodiment, the refresh manager 140 may generate a row-hammer address by collecting information on word lines (hereinafter referred to as rows) in the semiconductor memory device 200, which have been subjected to a row-hammer attack, based on the active address provided from the scheduler 120. The refresh manager 140 may collect information on the rows attacked by the row-hammer, using a combination of various methods, such as counting an activation number of each row of the semiconductor memory device 200, or randomly sampling rows activated in the semiconductor memory device 200. The refresh manager 140 may transmit the refresh-related command and the row-hammer address to the memory interface 150. In an embodiment, the refresh manager 140 may transmit the refresh-related command and the row-hammer address to the scheduler 120, and the scheduler 120 may schedule the refresh-related command and the row-hammer address according to the operating timing of the semiconductor memory device 200.

The memory interface 150 may be configured to communicate with the semiconductor memory device 200. For example, the memory interface 150 may transmit the command/address signal C/A and the data DQ to the semiconductor memory device 200 and receive the data DQ from the semiconductor memory device 200. The memory interface 150 may provide the command/address signal C/A to the semiconductor memory device 200 by receiving the command and address issued by the scheduler 120 and the refresh-related command and the row-hammer address generated by the refresh manager 140. In addition, the memory interface 150 may receive the host data HDATA from the host interface 110 and provide the data DQ to the semiconductor memory device 200.

The memory controller 100 may transmit data between the host interface 110, the scheduler 120, the row-hammer detector 130, the refresh manager 140, and the memory interface 150 via the bus 170. In an embodiment, the host interface 110, the scheduler 120, the row-hammer detector 130, the refresh manager 140, and the memory interface 150 may communicate with each other independently without passing through the bus 170. For example, the refresh manager 140 and the host interface 110 may communicate directly with each other without passing through the bus 170. The refresh manager 140 and the memory interface 150 may communicate with each other directly without passing through the bus 170. The host interface 110 and the memory interface 150 may also communicate directly with each other without passing through the bus 170.

The semiconductor memory device 200 may include a memory cell region in which a plurality of memory cells coupled to a plurality of word lines (hereinafter, referred to as a plurality of rows) and a plurality of bit lines (hereinafter, referred to as a plurality of columns) may be arranged in the form of an array. The plurality of memory cells may include memory cells that may cause a row-hammer phenomenon, or memory cells that require a refresh operation to secure data retention time. The semiconductor memory device 200 may perform an active operation, a precharge operation, a refresh operation, a write operation, and a read operation according to the command/address signal C/A and/or the data DQ that are provided from the memory controller 100.

For example, the semiconductor memory device 200 may perform an active operation of activating a row corresponding to an active address among a plurality of rows according to an active command, and a precharge operation of deactivating (or precharging) the active row according to a precharge command. For reference, in an embodiment, the active operation performed by the active address in a row unit may be referred to as an access operation, and an active command may be referred to as an access command. The active address may include a row address for selecting one of a plurality of rows.

The refresh operation may include a normal refresh operation of sequentially refreshing a plurality of rows according to the normal refresh command, and a target refresh operation of refreshing one or more neighboring rows disposed adjacent to a target row having a large number of activations or a high frequency of activations according to the refresh management command. For reference, to designate the target row, the row-hammer address may be provided from the memory controller 100. In an embodiment, the semiconductor memory device 200 may collect information on a row that has been subjected to a row-hammer attack by itself and generate a row-hammer address.

Hereinafter, configurations related to an embodiment of the present invention among the configurations of the memory controller 100 will be described in detail with reference to the drawings.

Figure 3:
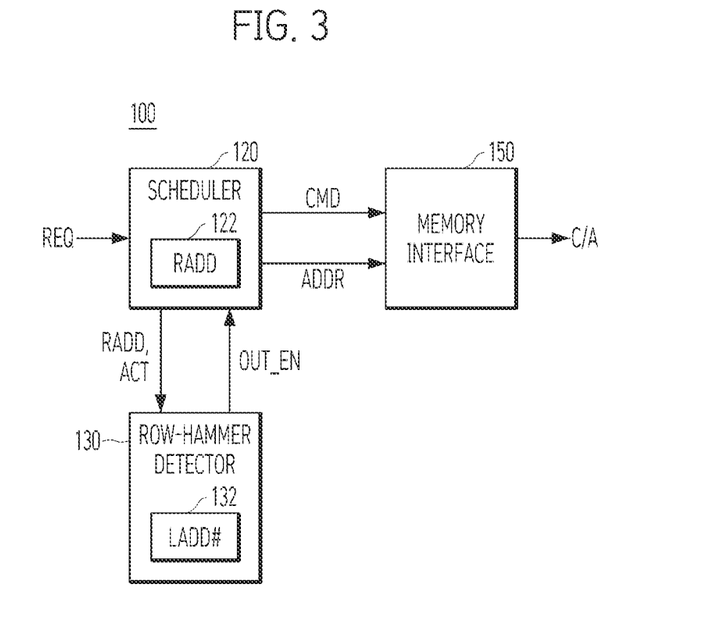
FIG. 3 is a detailed block diagram illustrating a memory controller shown in FIG. 2, in accordance with an embodiment of the present invention.

FIG. 3 is a detailed block diagram illustrating the memory controller 100 shown in FIG. 2, in accordance with a first embodiment of the present invention. In FIG. 3, to focus on the characteristics of the embodiment, a data-related configuration is omitted, and only a command/address-related configuration is illustrated.

Referring to FIG. 3, the scheduler 120 may generate a command CMD and an address ADDR by receiving a request REQ through the host interface 110. The command CMD may include an active command ACT, a precharge command, a read command, a write command, and the like. The address ADDR may include a bank address, a row address, and a column address.

For example, the scheduler 120 may generate the active command ACT and the active address according to the request REQ. The active address may include a row address RADD for selecting one of a plurality of rows of the semiconductor memory device 200. The scheduler 120 may provide the active command ACT and the active address RADD to the row-hammer detector 130.

The scheduler 120 may issue the command CMD and the address ADDR to the memory interface 150, except for the active command ACT and the active address RADD. On the other hand, in an embodiment, the scheduler 120 may determine whether to issue the active command ACT and the active address RADD according to an output control signal OUT_EN. When the output control signal OUT_EN is activated, the scheduler 120 may issue the active command ACT and the active address RADD and provide the same to the memory interface 150. When the output control signal OUT_EN is deactivated, the scheduler 120 may interrupt the issuance of the active command ACT and the active address RADD, and may store the active address RADD in an internal storage circuit 122. The scheduler 120 may reschedule the active command ACT and the active address RADD after a predetermined delay time and provide the same to the memory interface 150.

The row-hammer detector 130 may generate the output control signal OUT_EN by checking a row-hammer possibility based on the active command ACT and the active address RADD. The row-hammer detector 130 may preset a plurality of unit sections in advance and store the active address RADD in an address queue 132 as candidate addresses LADD #, where # is an integer greater than or equal to two, for each of the preset unit sections. The row-hammer detector 130 may initialize the address queue 132 for each unit section. The row-hammer detector 130 may compare the currently inputted active address RADD with the candidate addresses LADD # to deactivate the output control signal OUT_EN when the currently inputted active address RADD matches one of the candidate addresses LADD #, and to activate the output control signal OUT_EN when the currently inputted active address RADD is different from all of the candidate addresses LADD #. In this case, the row-hammer detector 130 may store the active address RADD as one of the candidate addresses LADD # according to the output control signal OUT_EN, to prevent overlapping candidate addresses LADD # from being stored. The detailed configuration and operation of the row-hammer detector 130 in accordance with an embodiment of the present invention will be described in FIGS. 5 to 8.

The memory interface 150 may provide the command/address signal C/A to the semiconductor memory device 200 by receiving the command CMD and the address ADDR issued by the scheduler 120. In addition, the memory interface 150 may receive the host data HDATA from the host interface 110 and provide the data DQ to the semiconductor memory device 200. Although not illustrated, the memory interface 150 may provide the command/address signal C/A to the semiconductor memory device 200 by receiving the refresh-related command and the row-hammer address generated from the refresh manager 140.

Figure 4:
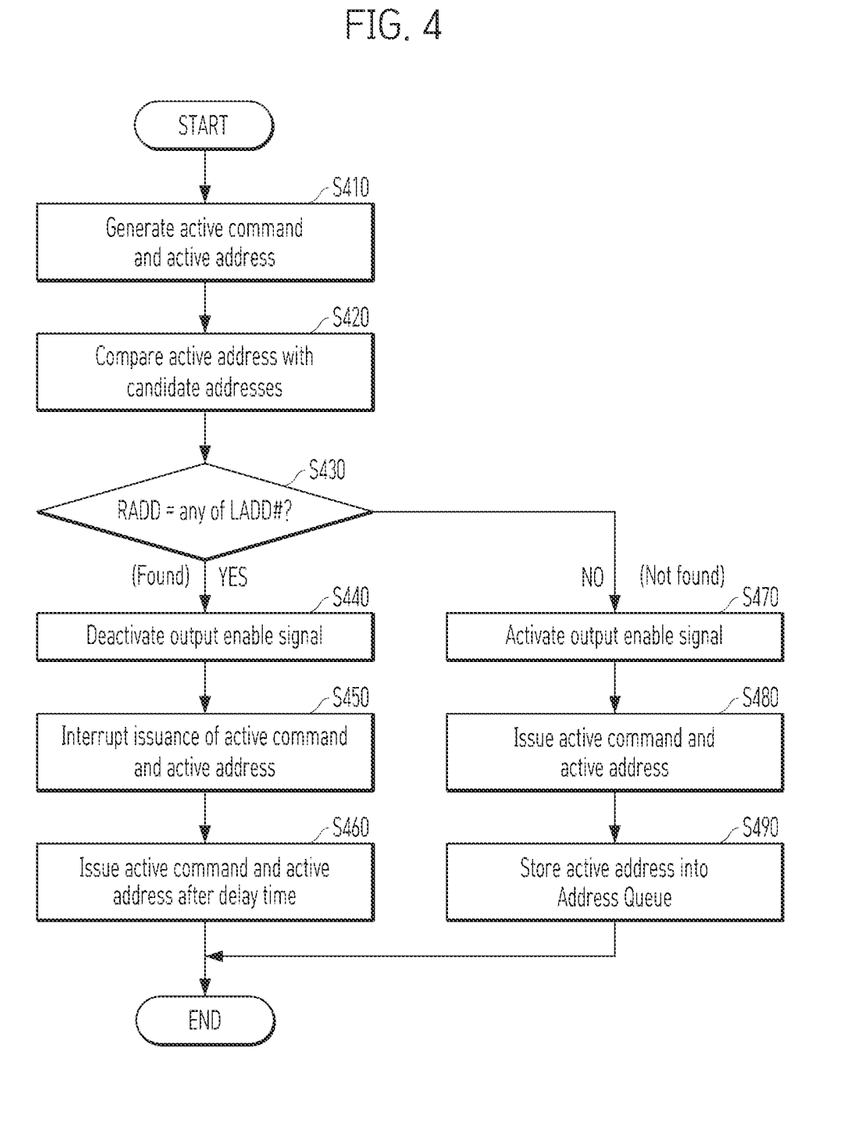
FIG. 4 is a flowchart for describing an operation of the memory controller of FIG. 3, in accordance with an embodiment of the present invention.

FIG. 4 is a flowchart for describing an operation of the memory controller 100 of FIG. 3, in accordance with an embodiment of the present invention.

Referring to FIG. 4, the scheduler 120 may generate the active command ACT according to the request REQ and generate the active address RADD corresponding to the active command ACT (at S410).

The row-hammer detector 130 may check the address queue 132 (at S420). The row-hammer detector 130 may compare the currently inputted active address RADD with the candidate addresses LADD # stored in the address queue 132, respectively.

If the currently inputted active address RADD is found in the address queue 132, that is, if the currently inputted active address RADD matches one of the candidate addresses LADD #(i.e., "YES (Found)" of S430), the row-hammer detector 130 may deactivate the output control signal OUT_EN (at S440). Accordingly, the scheduler 120 may interrupt the issuance of the currently inputted active command ACT and the currently inputted active address RADD (at S450). The scheduler 120 may store the active command ACT and the active address RADD in the internal storage circuit 122, and issue the active command ACT and the active address RADD stored in the internal storage circuit 122 after a predetermined delay time (at S460). Thus, the active command ACT and the active address RADD may be transferred to the memory interface 150. For example, the scheduler 120 may issue the active command ACT and the active address RADD again in one of the following unit sections.

Moreover, if the currently inputted active address RADD is not found in the address queue 132, that is, if the currently inputted active address RADD is different from all of the candidate addresses LADD #(i.e., "NO (Not found)" of S430), the row-hammer detector 130 may activate the output control signal OUT_EN (at S470). Accordingly, the scheduler 120 may issue and provide the currently inputted active command ACT and the currently inputted active address RADD to the memory interface 150 (at S480). As the output control signal OUT_EN is activated, the row-hammer detector 130 may store the active address RADD in the address queue 132 as one of the candidate addresses LADD #(at S490). The address queue 132 is initialized for each of the preset unit sections, and accordingly, the candidate addresses LADD # stored in the address queue 132 may be initialized.

As described above, in the memory system 10, the memory controller 100 may store the active address as the candidate addresses for each preset unit section, and interrupt the issuance of the active command and the active address when the currently inputted active address matches one of the candidate addresses. The memory controller 100 may issue the interrupted active commands and the interrupted active addresses to the next unit section. Thus, it is possible to reduce a risk of the row-hammer attacks in the entire section by blocking the issuance of overlapping active addresses in the unit section.

Hereinafter, a detailed configuration and operation of the row-hammer detector 130 will be described with reference to FIGS. 5 to 8.

Figure 5:
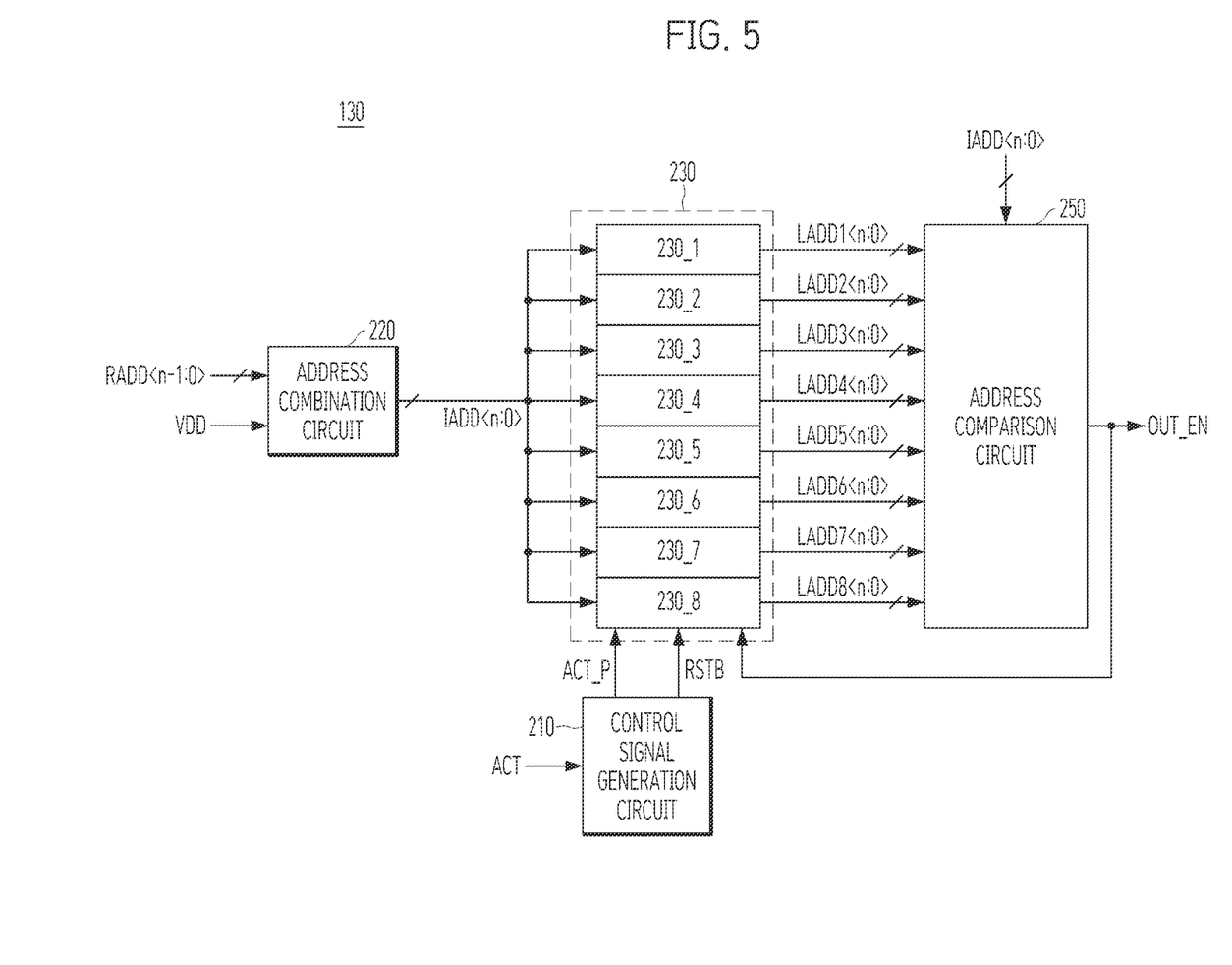
FIG. 5 is a detailed configuration diagram illustrating a row-hammer detector shown in FIG. 3, in accordance with an embodiment of the present invention.

FIG. 5 is a detailed configuration diagram illustrating the row-hammer detector 130 shown in FIG. 3, in accordance with an embodiment of the present invention.

Referring to FIG. 5, the row-hammer detector 130 may include a control signal generation circuit 210, an address combination circuit 220, an address queue 230 and an address comparison circuit 250.

The control signal generation circuit 210 may generate a reset signal RSTB and an active pulse signal ACT_P based on the active command ACT. For example, the control signal generation circuit 210 may generate the reset signal RSTB that is activated at a logic low level during an initial part of each unit section and the active pulse signal ACT_P that pulses at a logic high level for a predetermined section whenever the active command ACT is input.

The address combination circuit 220 may insert a logic high bit (i.e., a signal of a supply voltage (VDD) level) into the active address RADD<n−1:0> consisting of n bits, where n is an integer greater than or equal to two, to generate a combination address IADD<n:0> consisting of (n+1) bits. The logic high bit may be inserted into the most significant bit (MSB) of the active address RADD<n−1:0>, the least significant bit (LSB) of the active address RADD<n−1:0>, or any bit position of the active address RADD<n−1:0>. For example, the address combination circuit 220 may generate the combination address of "100000001" by inserting the logic high bit into the MSB of the active address of "00000001". In an embodiment, the address combination circuit 220 may generate the combination address IADD<n:0> by inserting one or more bits into the active address RADD<n−1:0>.

The address queue 230 may correspond to the address queue 132 of FIG. 3. The address queue 230 may sequentially store the combination address IADD<n:0> as the candidate addresses LADD1<n:0> to LADD8<n:0> for each preset unit section, while selectively storing the combination address IADD<n:0> according to the output control signal OUT_EN. The address queue 230 may be composed of a plurality of storage circuits 230_1 to 230_8 corresponding to the plurality of candidate addresses LADD1<n:0> to LADD8<n:0>, respectively. In FIG. 5, first to eighth storage circuits 230_1 to 230_8 for respectively storing first to eighth candidate addresses LADD1<n:0> to LADD8<n:0> are illustrated.

The first to eighth storage circuits 230_1 to 230_8 may be initialized according to the reset signal RSTB, enabled according to the output control signal OUT_EN, and sequentially store the combination address IADD<n:0> according to the active pulse signal ACT_P. Each of the first to eighth candidate addresses LADD1<n:0> to LADD8<n:0> may be composed of (n+1) bits corresponding to the bit number of the combination address IADD<n:0>. A width of the address queue 230 may be determined by the bit number (i.e., (n+1) bits) of each candidate address. The number of storage circuits provided in the address queue 230 (i.e., a depth of the address queue 230) may be determined depending on a length of the unit sections and a row active time (tRAS). Thus, a size of the address queue 230 may be set to the width*the depth.

The address comparison circuit 250 may generate the output control signal OUT_EN by comparing the combination address IADD<n:0> with the first to eighth candidate addresses LADD1<n:0> to LADD8<n:0>. The address comparison circuit 250 may deactivate the output control signal OUT_EN when the combination address IADD<n:0> matches one of the first to eighth candidate addresses LADD1<n:0> to LADD8<n:0>. The address comparison circuit 250 may activate the output control signal OUT_EN when the combination address IADD<n:0> is different from all of the first to eighth candidate addresses LADD1<n:0> to LADD8<n:0>.

For reference, the reason why the address queue 230 stores the combination address IADD<n:0> rather than the active address RADD<n−1:0> is as follows. As the reset signal RSTB is activated for each unit section, the first to eighth candidate addresses LADD1<n:0> to LADD8<n:0> may be initialized to all-zero bit. In this case, when the active address RADD<n−1:0> of the all-zero bit is input, the output control signal OUT_EN may be unintentionally deactivated. Accordingly, in an embodiment, since the address comparison circuit 250 may compare the combined address IADD<n:0> inserted with the logic high bit, with the candidate addresses LADD1<n:0> to LADD8<n:0>, it is possible to prevent the output control signal OUT_EN from being unintentionally deactivated even if the active address RADD<n−1:0> of the all-zero bit is input in a state where the first to eighth candidate addresses LADD1<n:0> to LADD8<n:0> are initialized to the all-zero bit.

Figure 6:
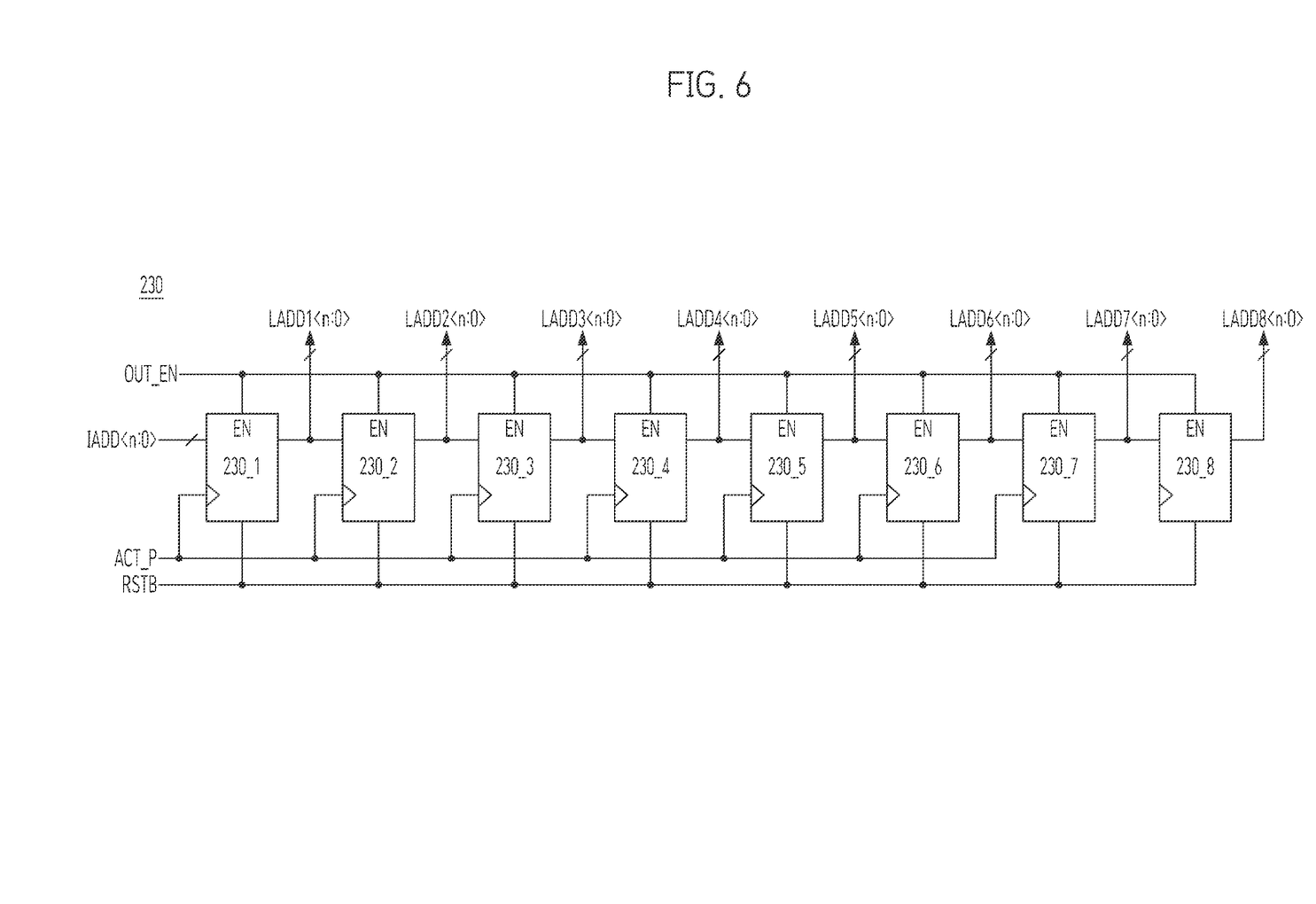
FIG. 6 is a detailed circuit diagram illustrating an address queue of FIG. 5, in accordance with an embodiment of the present invention.

FIG. 6 is a detailed circuit diagram illustrating the address queue 230 of FIG. 5, in accordance with an embodiment of the present invention.

Referring to FIG. 6, the address queue 230 may include first to eighth storage circuits 230_1 to 230_8, respectively corresponding to the first to eighth candidate addresses LADD1<n:0> to LADD8<n:0>.

The first to eighth storage circuits 230_1 to 230_8 may be initialized as the reset signal RSTB is activated and may be activated as the output control signal OUT_EN is activated at a logic high level. The first to eighth storage circuits 230_1 to 230_8 are connected in series with each other, and the first storage circuit 230_1 disposed at a first stage may receive the combination address IADD<n:0>. When the active pulse signal ACT_P pulses, each of the first to eighth storage circuits 230_1 to 230_8 may receive and store an address stored in a previous stage as a corresponding one of the first to eighth candidate addresses LADD1<n:0> to LADD8<n:0>. For example, each of the first to eighth storage circuits 230_1 to 230_8 may be composed of (n+1) flip-flops corresponding to each bit of the combination address IADD<n:0>.

With the above configuration, the address queue 230 may store the combination address IADD<n:0> corresponding to the active address RADD as the candidate addresses LADD1<n:0> to LADD8<n:0> for each preset unit section, while preventing overlapping candidate addresses LADD1<n:0> to LADD8<n:0> from being stored according to the output control signal OUT_EN.

Figure 7:
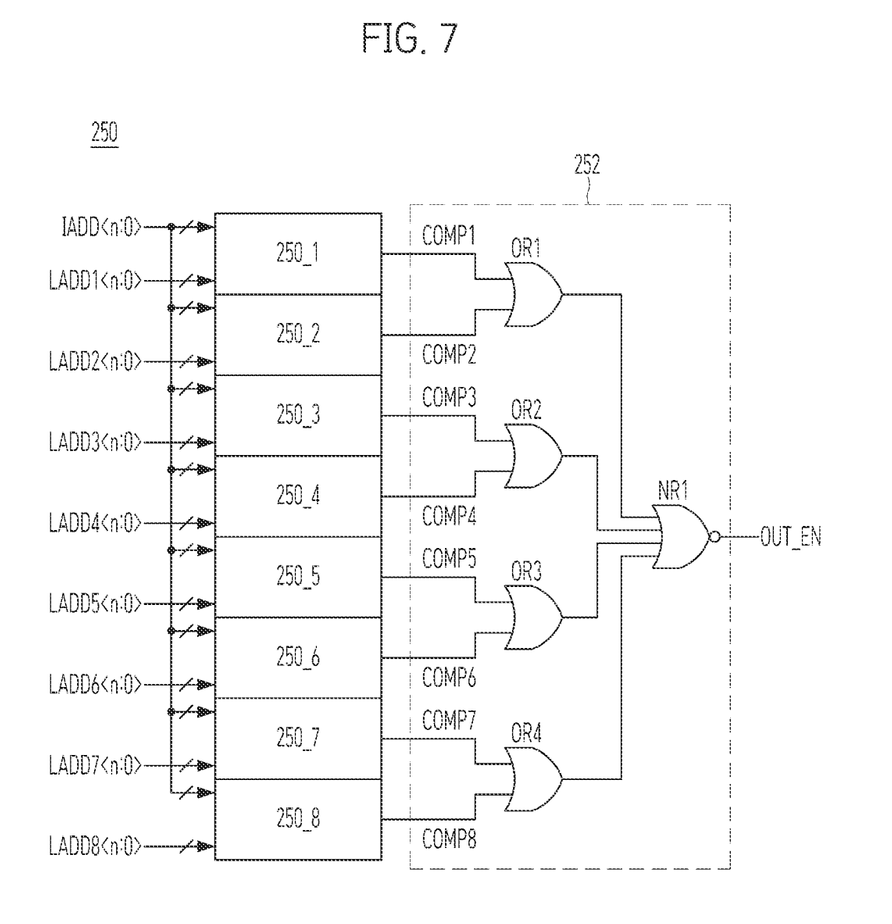
FIG. 7 is a detailed configuration diagram illustrating an address comparison circuit of FIG. 5, in accordance with an embodiment of the present invention.

FIG. 7 is a detailed configuration diagram illustrating the address comparison circuit 250 of FIG. 5, in accordance with an embodiment of the present invention.

Referring to FIG. 7, the address comparison circuit 250 may include first to eighth comparators 250_1 to 250_8 and an output control circuit 252.

The first to eighth comparators 250_1 to 250_8 may respectively correspond to the first to eighth candidate addresses LADD1<n:0> to LADD8<n:0>. The first to eighth comparators 250_1 to 250_8 may generate first to eighth comparison result signals CMP1 to CMP8 by comparing the combination address IADD<n:0> with the first to eighth candidate addresses LADD1<n:0> to LADD8<n:0>, respectively. Each of the first to eighth comparators 250_1 to 250_8 may compare respective bits of the combination address IADD<n:0> with the corresponding candidate address to generate the corresponding comparison result signal of a logic high level when all of the bits are the same, or to generate the corresponding comparison result signal of a logic low level when any of the bits are different. For example, each of the first to eighth comparators 250_1 to 250_8 may be composed of logic circuits that perform a logic exclusive OR (XOR) operation or a logic exclusive NOR (XNOR) operation.

The output control circuit 252 may generate the output control signal OUT_EN based on the first to eighth comparison result signals CMP1 to CMP8. When any of the first to eighth comparison result signals CMP1 to CMP8 has a logic high level, the output control circuit 252 may deactivate the output control signal OUT_EN to a logic low level. When all of the first to eighth comparison result signals CMP1 to CMP8 are at a logic low level, the output control circuit 252 may activate the output control signal OUT_EN to a logic high level. For example, the output control circuit 252 may include first to fourth OR gates OR1 to OR4 and a NOR gate NR1. Each of the first to fourth OR gates OR1 to OR4 may perform a logic OR operation on two comparison result signals among the first to eighth comparison result signals CMP1 to CMP8. The NOR gate NR1 may perform a logic NOR operation on output signals of the first to fourth OR gates OR1 to OR4.

With the above configuration, the address comparison circuit 250 may deactivate the output control signal OUT_EN at a logic low level when the combination address IADD<n:0> corresponding to the active address RADD matches one of the candidate addresses LADD1<n:0> to LADD8<n:0>, and activate the output control signal OUT_EN at a logic high level when the combination address IADD<n:0> is different from all of the candidate addresses LADD1<n:0> to LADD8<n:0>.

Hereinafter, an operation of the row-hammer detector 130 in accordance with an embodiment of the present invention will be described with reference to FIGS. 2 to 8.

Figure 8:
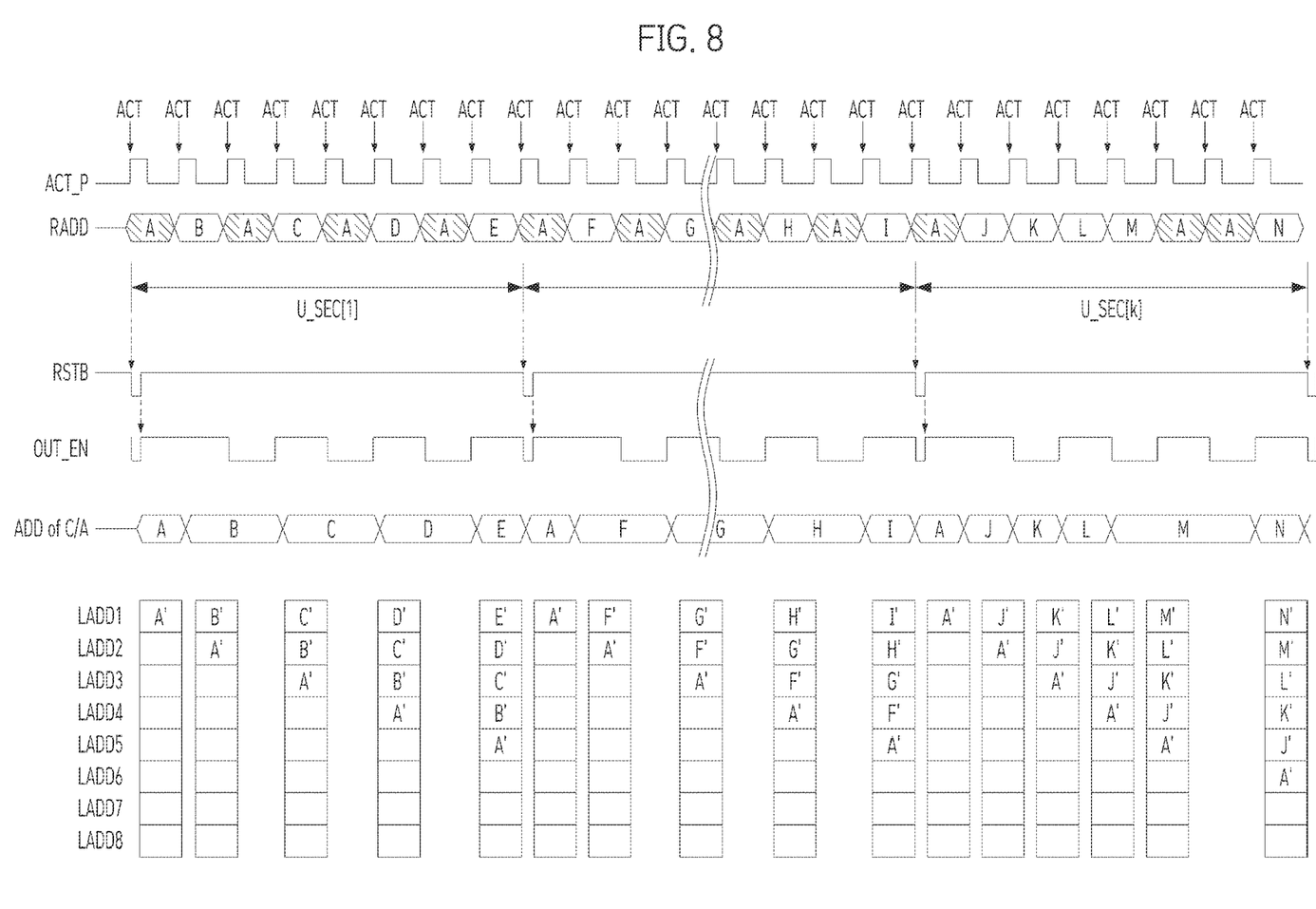
FIG. 8 is a timing diagram for describing an operation of the row-hammer detector, in accordance with an embodiment of the present invention.

FIG. 8 is a timing diagram for describing an operation of the row-hammer detector 130, in accordance with an embodiment of the present invention.

Referring to FIG. 8, the row-hammer detector 130 may preset a number of unit sections U_SEC[1] to U_SEC[k], where k is an integer greater than or equal to two. The length of each section of the unit sections U_SEC[1] to U_SEC[k]

may be set to m times the row active time (tRAS), where m is a positive real number greater than 1. The depth of the address queue 230 may be determined according to the length of each section and the row active time (tRAS). For example, when the row active time (tRAS) is 50 ns and the length of each section is set to 400 ns, the depth of the address queue 230 may be determined as 8, which is obtained by dividing the length of each section by the row active time (tRAS), i.e., 400/50. That is, the address queue 230 may store eight candidate addresses. In this case, the size of the address queue 230 may be determined to be the width*the depth=8*(n+1) bits.

In FIG. 8, eight active commands ACT and 8 active addresses RADD are inputted during each of the unit sections U_SEC[1] to U_SEC[k]. The control signal generation circuit 210 of the row-hammer detector 130 may generate the reset signal RSTB that is activated during the initial part of each of the unit sections U_SEC[1] to U_SEC[k]. The address queue 230 may be initialized for the initial part of each of the unit sections U_SEC[1] to U_SEC[k] according to the reset signal RSTB. The control signal generation circuit 210 may generate the active pulse signal ACT_P when the active command ACT is input, and the address combination circuit 220 may generate the combination address by inserting a logic high bit into the active address RADD.

For example, during the first unit section U_SEC[1], the active address RADD of "A" is input along with the active command ACT. The address comparison circuit 250 may generate the output control signal OUT_EN of a logic high level by comparing the combination address of "A'" corresponding to the active address RADD of "A" with the candidate addresses LADD1 to LADD8 that are initialized. The address queue 230 may store the combination address of "A'" as a first candidate address LADD1 according to the active pulse signal ACT_P. In this case, it is possible to prevent the output control signal OUT_EN from being unintentionally inactivated even if the active address RADD of all-zero bit is input by using the combination address rather than the active address RADD. When the output control signal OUT_EN is activated, the scheduler 120 may issue the active command ACT and the active address RADD of "A" to the memory interface 150. The memory interface 150 may receive the active command ACT and the active address RADD issued from the scheduler 120 to transmit the command/address signal C/A to the memory device 200.

Next, the active address RADD of "B" is input along with the active command ACT. The address comparison circuit 250 may generate the output control signal OUT_EN of a logic high level by comparing the combination address of "B" corresponding to the active address RADD of "B" with the candidate addresses LADD1 to LADD8. The address queue 230 may shift and store the first candidate address LADD1 of "A'" as the second candidate address LADD2, and store the combination address of "B'" as the first candidate address LADD1, according to the active pulse signal ACT_P. Similarly, since the output control signal OUT_EN is activated, the scheduler 120 may issue the active command ACT and the active address RADD of "B" to the memory interface 150. The memory interface 150 may receive the active command ACT and the active address RADD issued from the scheduler 120 to transmit the command/address signal C/A to the memory device 200.

Next, the active address RADD of "A" is input along with the active command ACT. The address comparison circuit 250 may compare the combination address of "A'" with the candidate addresses LADD1 to LADD8 to output the output control signal OUT_EN of a logic low level since the combination address of "A'" is identical to the second candidate address LADD2 of "A'". The address queue 230 may maintain previously stored candidate addresses LADD1 to LADD8 without storing the combined address of "A'" according to the output control signal OUT_EN of the logic low level. Since the output control signal OUT_EN is deactivated, the scheduler 120 may interrupt the issuance of the active command ACT and the active address RADD of "A", while storing the active address RADD of "A" in the internal storage circuit 122.

Next, the active address RADD of "C" is input along with the active command ACT. The address comparison circuit 250 may generate the output control signal OUT_EN of a logic high level by comparing the combination address of "C" corresponding to the active address RADD of "C" with the candidate addresses LADD1 to LADD8. The address queue 230 may shift and store the second candidate address LADD2 of "A'" as the third candidate address LADD3, shift and store the first candidate address LADD1 of "B" as the second candidate address LADD2, and store the combination address of "C'" as the first candidate address LADD1, according to the active pulse signal ACT_P. Similarly, since the output control signal OUT_EN is activated, the scheduler 120 may issue the active command ACT and the active address RADD of "C" to the memory interface 150. The memory interface 150 may receive the active command ACT and the active address RADD issued from the scheduler 120 to transmit the command/address signal C/A to the memory device 200.

Next, the active address RADD of "A" is input along with the active command ACT. The address comparison circuit 250 may compare the combination address of "A'" with the candidate addresses LADD1 to LADD8 to output the output control signal OUT_EN of a logic low level since the combination address of "A'" is identical to the third candidate address LADD3 of "A". The address queue 230 may maintain previously stored candidate addresses LADD1 to LADD8 without storing the combined address of "A" according to the output control signal OUT_EN of the logic low level. Since the output control signal OUT_EN is deactivated, the scheduler 120 may interrupt the issuance of the active command ACT and the active address RADD of "A", while storing the active address RADD of "A" in the internal storage circuit 122.

As described above, during the first unit section U_SEC[1], the row-hammer detector 130 may detect the active command ACT repeatedly input for the same active address RADD of "A", and the scheduler 120 may store the active command ACT and the active address RADD. The scheduler 120 may reschedule and issue the active commands ACT and the active addresses RADD stored in the internal storage circuit 122 after the first unit section U_SEC[1] ends.

The above process is repeated for each unit section U_SEC[2] to U_SEC[k], detecting the active command ACT repeatedly input for the same active address RADD, and delaying the issuance of the active command ACT and the active address RADD to the memory device, to thereby reduce a risk of the row-hammer attacks.

Figure 9:
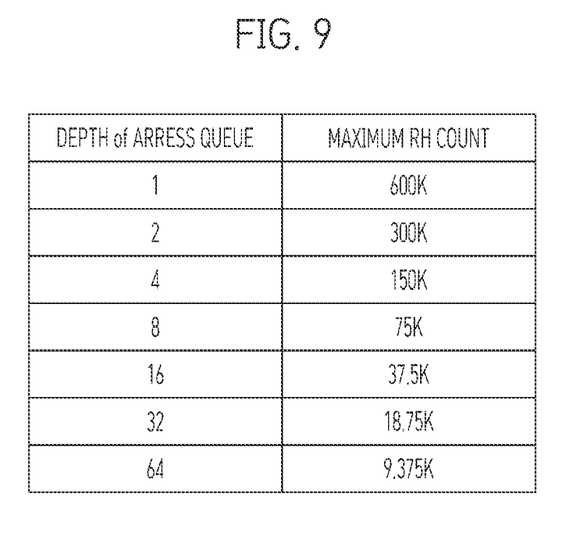
FIG. 9 is a table showing the number of row-hammer counts according to a depth of the address queue according to an embodiment of the present invention.

FIG. 9 is a table showing the number of row-hammer counts according to the depth of the address queue 230 according to an embodiment of the present invention.

Referring to FIG. 9, the table shows that a maximum row-hammer (RH) count decreases in proportion as the depth of the address queue 230 increases from 1 to 64.

The depth of the address queue 230 of 1 may mean a case that the address queue 230 may store one candidate address during each unit section, and the depth of the address queue 230 of 64 may mean a case that the address queue 230 may store 64 candidate addresses during each unit section. The maximum RH count may mean a maximum number of active commands issuable to the memory device.

That is, as the number of candidate addresses stored in the address queue 230 during a unit section increases, the maximum number of active commands issuable to the memory device decreases, thereby reducing a risk of the row-hammer attacks.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory controller comprising:
a scheduler configured to generate an active command and an active address, and determine whether to issue the active command and the active address according to an output control signal, wherein the scheduler is configured to issue the active command and the active address when the output control signal is activated; and delay the issuance of the active command and the active address for a predetermined time when the output control signal is deactivated;
a row-hammer detector configured to generate the output control signal by checking a row-hammer possibility based on the active command and the active address; and
a memory interface configured to provide the active command and the active address issued by the scheduler to a memory device.

2. The memory controller of claim 1, wherein the row-hammer detector is configured to:
store the active address as a plurality of candidate addresses for each of a plurality of preset unit sections;
deactivate the output control signal when the active address matches one of the plurality of candidate addresses; and
activate the output control signal when the active address is different from all of the plurality of candidate addresses.

3. The memory controller of claim 1, wherein the row-hammer detector includes:
an address queue configured to sequentially store a combination address corresponding to the active address as a plurality of candidate addresses for each of a plurality of preset unit sections, while selectively storing the combination address according to the output control signal; and
an address comparison circuit configured to compare the combination address with the plurality of candidate addresses to generate the output control signal.

4. The memory controller of claim 3,
wherein the address queue includes a plurality of storage circuits respectively corresponding to the plurality of candidate addresses, and coupled in series,
wherein a storage circuit disposed at a first stage receives the combination address, and
wherein the storage circuits are initialized according to a reset signal activated for each unit section, activated according to the output control signal, and sequentially store the combination address into the plurality of candidate addresses according to the active command.

5. The memory controller of claim 3, wherein the address comparison circuit includes:
a plurality of comparators respectively corresponding to the plurality of candidate addresses, and configured to compare the combination address with the plurality of candidate addresses, respectively to generate a plurality of comparison result signals; and
an output control circuit configured to generate the output control signal based on the plurality of comparison result signals.

6. The memory controller of claim 3, further comprising:
an address combination circuit configured to insert at least one bit into the active address to generate the combination address.

7. A memory system comprising:
a memory device including a plurality of rows respectively coupled to memory cells; and
a memory controller configured to generate an access command and an access address for each row, check a row-hammer possibility based on the access command and the access address to generate an output control signal, and determine whether to issue the access command and the access address to the memory device, according to the output control signal, wherein the memory controller is configured to issue the access command and the access address when the output control signal is activated; and delay the issuance of the access command and the access address for a predetermined time when the output control signal is deactivated.

8. The memory system of claim 7, wherein the memory controller includes:
a scheduler configured to generate the access command and the access address, and determine whether to issue the access command and the access address according to the output control signal;
an address queue configured to sequentially store a combination address corresponding to the access address as a plurality of candidate addresses for each of a plurality of preset unit sections, while selectively storing the combination address according to the output control signal; and
an address comparison circuit configured to compare the combination address with the plurality of candidate addresses to generate the output control signal.

9. The memory system of claim 8,
wherein the address queue includes a plurality of storage circuits respectively corresponding to the plurality of candidate addresses, and coupled in series, wherein a storage circuit disposed at a first stage receives the combination address, and wherein the storage circuits are initialized according to a reset signal activated for each unit section, activated according to the output control signal, and sequentially store the combination address into the plurality of candidate addresses according to the access command.

10. The memory system of claim 8, wherein the address comparison circuit includes:

a plurality of comparators respectively corresponding to the plurality of candidate addresses, and configured to compare the combination address with the plurality of candidate addresses, respectively to generate a plurality of comparison result signals; and an output control circuit configured to generate the output control signal based on the plurality of comparison result signals.

11. The memory system of claim 8, further comprising:

an address combination circuit configured to insert at least one bit into the active-access address to generate the combination address.

12. An operating method of a memory controller, the operating method comprising:

generating an active command and an active address;

comparing the active address with a plurality of candidate addresses stored in an address queue;

issuing, according to a determination that the active address is different from all of the plurality of candidate addresses, the active command and the active address to a memory device while storing the active address as one of the plurality of candidate addresses in the address queue; and interrupting, according to a determination that the active address is equal to one of the plurality of candidate addresses, the issuance of the active command and the active address and storing the active address in an internal storage circuit; and issuing the active command and the active address stored in the internal storage circuit after a predetermined delay time.

13. The operating method of claim 12, further comprising:

initializing the address queue for each of a plurality of preset unit sections.

\* \* \* \* \*